United States Patent [19]
Schmidt

[11] Patent Number: 5,193,012
[45] Date of Patent: Mar. 9, 1993

[54] REAL-TIME CONVERSION OF STILL-VIDEO TO HALF-TONE FOR HARD COPY OUTPUT (SUCH AS ON A FACSIMILE MACHINE)

[75] Inventor: Jonathan E. Schmidt, San Antonio, Tex.

[73] Assignee: Snap-Fax Corporation, Dallas, Tex.

[21] Appl. No.: 693,444

[22] Filed: Apr. 29, 1991

[51] Int. Cl.[5] .............................................. B41J 3/02
[52] U.S. Cl. .................................... 358/456; 358/909; 346/76 PH
[58] Field of Search ............ 358/298, 456, 444, 75–80, 358/909; 346/154, 155, 76 PH, 76 L, 76 R

[56] References Cited

U.S. PATENT DOCUMENTS

| | | | |
|---|---|---|---|
| 4,158,203 | 6/1979 | Johnson, Jr. et al. | 346/76 PH |
| 4,443,121 | 4/1984 | Arai | 346/76 PH |
| 4,492,482 | 1/1985 | Eguchi et al. | 346/76 PH |
| 4,521,790 | 6/1985 | Allard | 346/155 |
| 4,556,891 | 12/1985 | Matsushita et al. | 346/76 PH |
| 4,858,020 | 8/1989 | Homma | 358/909 |
| 4,937,676 | 6/1990 | Finelli et al. | 358/909 |
| 4,942,477 | 7/1990 | Nakamura | 358/909 |

*Primary Examiner*—Stephen Brinich
*Attorney, Agent, or Firm*—Baker & Botts

[57] ABSTRACT

A real-time still-video to facsimile conversion system (FIG. 3) converts a still-video image frame into a half-tone facsimile reproduction without having to store an entire intermediated grey-scale image frame. Conversion of a still-video image to a half-tone facsimile output is accomplished by repeatedly transmitting the still-video image frame from a still-video source to a still-video input circuit (10), with a virtual facsimile page synchronization module (20) providing synchronization to a virtual facsimile page. In successive image frames, a video pixel grabber (34) grabs successive columns of image pixels, and provides them to a half-tone pixel converter (32) for conversion to facsimile lines—for the exemplary embodiment a 3×3 half-tone pixel format is used, so that the 525 raster lines of an image pixel column are transformed into three facsimile lines using a total of 1575 dots per line (out of the standard 1728 dot facsimile line). After conversion of each column of image pixels, the corresponding facsimile lines are buffered in a facsimile multi-line buffer (36) for conventional facsimile transmission by a half-tone facsimile output module (40) to a facsimile machine for facsimile reproduction.

27 Claims, 3 Drawing Sheets

REAL-TIME CONVERSION OF STILL-VIDEO TO HALF-TONE FOR HARD COPY OUTPUT (SUCH AS ON A FACSIMILE MACHINE)

TECHNICAL FIELD OF THE INVENTION

The invention relates generally to still-video technology, and more particularly relates to a system and method for real-time conversion of still-video image data into output data for hard copy image reproduction. In even greater particularity, the invention enables still-video images captured on video storage media to be converted in real-time to half-tone data without conversion to an intermediate (gray scale or half-tone) image for communication to facsimile equipment for hard copy output.

BACKGROUND OF THE INVENTION

Still-video equipment produces still-video snapshots of moving or stationary images. In contrast to conventional photographic equipment, the video image or "picture" is captured as digital data on magnetic storage media such as a floppy disk.

The specific problem to which the invention is applicable is the reproduction of still-video images captured on magnetic media in hard copy form.

Still-video systems can transmit still-video (or freeze-frame) images, in color or black and white, over telecommunications facilities, and then print hard copy reproductions of those images. Specific examples include: (a) wire photography; (b) still-video peripheral equipment; and (c) specialty products.

Wire photography, and its extension radio photography, have long been used by the news media. The most common form involves an input device that converts photographs into encoded signals for communication over telecommunications facilities or radio. At the receiving end, reproducing equipment reconverts the encoded image signals by exposing photographic film or other sensitized paper. The term facsimile is often used with these products.

Still-video equipment has recently become available from such vendors such as Canon and Sony, and is again primarily used by the television and print media, although applications are expanding rapidly in such areas as insurance investigation and real estate. A still-video camera (or camcorder) captures a full-color still-video image that can be reproduced using a special video printer that converts the still-video image data into hard copy form. For applications requiring communication of the still-video image, transmit/receive units are available that transmit/receive video signals—the signal begins and ends as a video image, and proprietary transmission techniques are typically used for communication.

An example of a specialty product is the PhotoPhone from Image Data Corporation. This product has a video camera, display and storage facility in a terminal package. One terminal can send a real-time or stored still-video image to another for display or storage, or printing on special video printers. The signal begins and ends as a video image, and may use standard or proprietary transmission techniques.

Another example of a specialty product is the special peripheral equipment available for personal computers (PCs) that enable the input/output, storage and processing of still-video images in digitized formats. For instance, the Canon PV-540 is a floppy disk drive that uses conventional still-video disks, digitizing a still-video image using a conventional format, and communicating with the PC through a standard computer I/O port.

Most PC communication utilities for still-video images are based on one of a number of conventional data record formats. Once an image is stored in one of these formats as a single file under the PC operating system, it can be mailed by E-mail or communicated by any of the common communications programs to another PC. The still-video image file can be transferred to photographic film, or printed on conventional laser printers.

Laser printers and some other image output equipment often use a half-tone format that produces a half-tone photographic image. More recently, standard facsimile equipment has been enhanced for transmitting half-tone images. In addition, for personal computers, facsimile interface products are available for digitally capturing a complete still-video picture from a video source, and, through a software transformation, creating a half-tone image suitable for transmission to a facsimile machine.

These half-tone images are created by arranging the conventional facsimile dot-pattern output into half-tone pixels—dot matrix areas, or dot clusters, that contain a predetermined number dots. A half-tone picture is composed of half-tone pixels, each of which can be varied from white to black by appropriately selecting the number of dots that are included within a pixel.

Producing optimum image quality in half-tone is considered an "art" in the publishing business. Many parameters are manipulated, including shades of grey, dots per inch, the shape of the dots, the arrangement of the dot dither (a smoothing technique), screen angle (the angular relationship of the dots to each other), and transfer functions (changing the density at various gray levels to compensate for ink retention). Half-tone resolution in newspapers have "rulings" of from 55 to 150 lines per inch, while magazine parameters commonly fall between 120 to 150 lines per inch.

In currently available equipment for producing half-tone reproductions of still-video images, an entire still-video image is stored as an intermediate digitized grey-scale image frame prior to being converted to half-tone data for producing a hard copy output. Such an intermediated storage stage is disadvantageous in a number of respects.

Cost factors can become significant if additional components, such as memory chips and supporting logic, are required (thereby also increasing power consumption). In particular, the requirement for digital memory to store an intermediate still-video half-tone frame significantly increases the size of the resulting electronics including, if portability is desired, battery storage. Also, intermediate digital storage requires an intermediate grey-scale digitization that introduces irregularity into subsequent image transformations, with resulting loss of resolution and image quality degradation.

In particular, in the case of facsimile printing that also involves a digital format in the form of the printing dots, the image patterns from the intermediate grey-scale image data can result in beat-frequencies or super patterns when merged with the facsimile dot formats. These extra patterns can cause significant image quality degradation without substantial electronic filtering. Such filtering requires extra components and can, itself, degrade resolution or image quality.

Accordingly, a need exists for still-video conversion equipment that can convert still-video image data in real-time for hard copy output without the need for creating or storing an intermediate still-video image frame.

SUMMARY OF THE INVENTION

The invention is a real-time still-video to half-tone conversion system and method for directly converting a still-video image into a half-tone hard copy without requiring the creation or storage of an intermediate image frame. In an exemplary application, the invention is used to convert still-video images captured on video floppy disks into half-tone image data for hard copy output using conventional facsimile equipment.

In one aspect of the invention, the real-time still-video conversion technique is initiated by repetitive transmissions of a still-video image frame from the still-video source. Each still-video image frame is synchronized to a virtual hard copy page defined by a matrix of pixels, with each virtual hard copy pixel being associated with a corresponding image pixel of the still-video frame, with each image pixel being characterized by an amplitude value.

In successive identical still-video image frames, selected successive blocks of image pixels are converted into corresponding blocks of half-tone pixels, each with a selected half-tone dot pattern. Each converted block of half-tone pixels is then transmitted to the hard copy output device to produce half-tone hard copy output. This half-tone conversion process is repeated until the still-video frame is completely converted into a half-tone hard copy.

In another aspect of the invention, a real-time still-video conversion system includes: a video input circuit, a virtual page synchronization generator, a half-tone pixel generator, and a transmitter circuit.

The video input circuit receives the repeated transmissions of a selected still-video image frame from the still-video source. The virtual page synchronization generator synchronizes each of these identical still-video image frames to a virtual hard copy page defined by a matrix of hard copy pixels, i.e., each image pixel (characterized by an amplitude value) is associated with a corresponding hard copy pixel.

In successive still-video image frames, the half-tone pixel generator converts selected successive blocks of image pixels into corresponding half-tone pixels, each with a selected half-tone dot pattern.

After conversion, the transmitter circuit transmits each converted block of half-tone pixels is then transmitted to the hard copy output device, which produces half-tone hard copy output. In this manner, successive blocks of image pixels from successive still-video image frames are converted and then transmitted to the hard copy output device until the still-video frame is completely converted into a half-tone hard copy.

In an exemplary embodiment of the invention, the real-time still-video to facsimile conversions system is used to convert a still-video image into half-tone facsimile data for producing a half-tone hard copy on standard facsimile equipment. Video processing is performed on the received still-video image frames to optimize the operation of the system for facsimile data.

The virtual page synchronization generator defines a virtual hard copy page in which the still-video image frame is rotated 90 degrees, yielding an aspect ratio for the half-tone facsimile that corresponds to conventional video and photographic aspect ratios. For example, with this rotation, a 3:1 mapping of the standard 525 line video raster format uses 1575 (3×525) of the 1728 dots of the standard facsimile line format, so that a 3×3 half-tone facsimile pixel format is achieved by using three facsimile lines to define a single line of half-tone facsimile pixels corresponding to a column string of still-video image pixels.

Under control of the virtual page synchronization generator, a still-video image pixel grabber circuit grabs successive column strings of image pixels and digitizes the video amplitude for each image pixel. Each digitized column string of image pixels is input to the half-tone pixel generator, which converts each image pixel into a corresponding 3×3 half-tone pixel, using conventional smoothing techniques to improve image quality.

A multi-line buffer is used to hold up to six lines of facsimile data, i.e., two lines of half-tone facsimile pixels corresponding to two column strings of image pixels. These facsimile lines are sequentially read out of the multi-line buffer and transmitted to standard facsimile equipment for half-tone hard copy output of the still-video image.

The virtual page synchronization generator, the half-tone pixel generator, and the multi-line buffer are preferably implemented in software using a conventional microprocessor. The microprocessor interfaces to a conventional integrated facsimile modem, reading facsimile data out of the multi-line buffer and performing virtual facsimile page generation and protocol conversion.

The technical advantages of the invention include the following. The real-time conversion technique enables the design of still-video to facsimile equipment that is portable and low cost, while providing a good quality half-tone reproduction of a still-video image or other picture that can be captured and stored in a still-video format. With such a product, a still-video image database can be made accessible as printed output without the additional expense of video printers. Moreover, a still-video image can be propagated at facsimile speeds to conventional facsimile equipment over standard telecommunications facilities.

The real-time still-video to facsimile technique converts the still-video output from standard still-video equipment into a corresponding continuous facsimile data transmission for output as a half-tone facsimile reproduction. Conventional smoothing and other video processing can be employed to optimize the quality of the half-tone conversion. Eliminating the need for creating or storing an intermediate frame obviates the need to provide additional memory (and associated supporting logic) to store the intermediate frame, thereby reducing both size and power consumption, and facilitating portable designs. In addition, eliminating the intermediate conversion and storage operations removes an intermediate digitization, thereby reducing filtering requirements.

A more complete description of the invention, as well as further features and advantages, are provided by the Detailed Description of exemplary embodiments of the invention, read in conjunction with the accompanying Drawings. Although the Detailed Description and the Drawings are directed to specific exemplary embodiments, various modifications of these exemplary embodiments, as well as alternative embodiments, will be suggested to those skilled in the art, and it is to be understood that invention encompasses any modifications or alternative embodiments that fall within the scope of the appended claims.

DETAILED DESCRIPTION OF THE INVENTION

Figure 1:
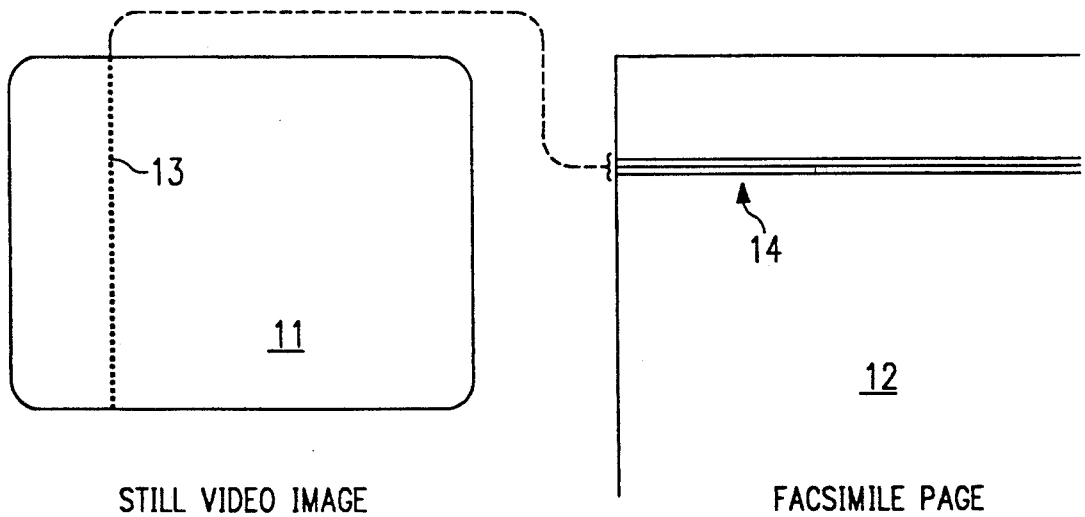
FIG. 1 illustrates the geometry of the still-video to facsimile transformation, including the 90 degree rotation of the image.
Figure 2A:
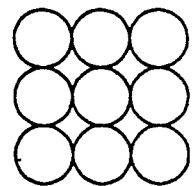
FIGS. 2a-2f illustrate six of the possible ten half-tone facsimile pixels available using the exemplary 3×3 dot cluster arrangement.
Figure 2B:
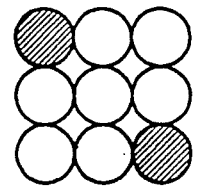
Figure 2C:
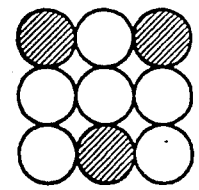
Figure 2D:
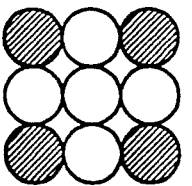
Figure 2E:
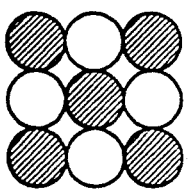
Figure 2F:
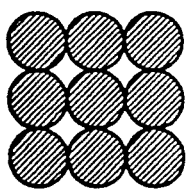

The detailed description of exemplary embodiments of the real-time still-video to half-tone conversion system is organized as follows:
1. Still-Video
2. Still-Video to Half-Tone Transformation
   2.1. Still-Video to Facsimile Rotation
   2.2. Half-Tone Facsimile Pixels
3. Real-Time Conversion System
   3.1. Still-Video Input
   3.2. Virtual Page Synchronization
   3.3. Half-Tone Transformation
   3.4. Half-Tone Facsimile Output
   3.5. Still-Video to Facsimile Operation
4. Exemplary Applications The exemplary implementation is a real-time still-video to facsimile conversion system that converts still-video images captured by standard still-video equipment into half-tone facsimile data for transmission to standard facsimile equipment and resulting hard-copy output as a half-tone facsimile image. Such a product offers unique remote imaging solutions for a wide variety of applications, such as intelligence gathering, priority news, insurance investigations, and real estate. However, the real-time still-video to half-tone conversion technique has general applicability to converting still-video images into a half-tone format without requiring the creation or storage of a grey-scale or other intermediate image frame.

1. Still-Video

The real-time still-video to facsimile system uses currently available still-video equipment capable of capturing a still-video image (or "snap-shot") as analog still-video data onto a storage media, such as a video floppy disk. The still-video equipment is able access stored still-video data for a selected still-video image to provide a steady still-video output.

Examples of such still-video equipment that are commercially available are the Sony Mavica or Canon XAPSHOT. Basically, this still-video equipment has standardized around a miniature floppy disc approximately 2¼ inches square using one of two formats: lower-resolution field capture in which stores half the 525 lines of the full video frame in 50 pictures on the floppy, and higher-resolution frame capture which stores the full 525 lines in 25 pictures on the floppy.

Some cameras can play the video back to a video device such as a television, video recorder or computer with video input, as well as the real-time still-video to facsimile conversion system. Playback begins with the user selecting the picture, by number, which is fed to the receiving device. In addition, playback devices are available that read the floppy discs and create video, or digitally convert a still-video image which may be read by a computer through an I/O channel as a grey-scale image.

In addition to still-video equipment, the still-video source can be a single frame a camcorder, VCR, or optical disk.

2. Still-Video to Half-Tone Transformation

The real-time still-video to facsimile conversion technique converts the steady still-video output from the still-video equipment into a corresponding steady half-tone facsimile output signal. For the exemplary application of the real-time conversion technique, the half-tone facsimile output signal is communicated as a normal facsimile transmission to standard facsimile equipment for output as a half-tone facsimile reproduction of the still-video image.

The exemplary real-time still-video to facsimile conversion technique involves: (a) receiving from a still-video source continuously transmitted frames of a still-video image; (b) synchronizing each still-video image frame to a virtual half-tone facsimile page in which the still-video image is characterized as a matrix of line and column pixels and a 90 degree rotation is used to map column strings of still-video image pixels into corresponding lines of 3×3 half-tone facsimile pixels; (c) grabbing successive column strings of still-video image pixels corresponding to successive lines of half-tone facsimile pixels; and (d)) converting each column string of still-video image pixels into facsimile lines that define a corresponding line of half-tone facsimile pixels. These facsimile lines that define the half-tone facsimile pixels ar then transmitted line by line to standard facsimile equipment to produce a half-tone facsimile (hard copy) output.

2.1. Still-Video to Facsimile Rotation

FIG. 1 illustrates the transformation from a still-video image format 11 to a facsimile format 12. The exemplary still-video image comprises a standard 525 line video raster image with a 4:3 aspect ratio. The exemplary facsimile page is based on the standard facsimile format of 1728 dots per line.

For the exemplary embodiment, the still-video image is characterized as a line and column matrix of still-video image pixels: 525 raster lines and 700 column positions, corresponding to the 4:3 aspect ratio. Transformation of these still-video image pixels into corresponding facsimile half-tone pixels is accomplished with a 90 degree rotation of the image. For example, a column string 13 of still-video image pixels is rotated into a line 14 of the facsimile half-tone pixels (with each line 14 on the facsimile page being formed by three facsimile lines).

The use of a 90 degree rotation of the image more closely fits the standard 4:3 video aspect ratio, with the width being greater than the height. This transformation also conveniently maps the 525 video lines into the fixed 1728 dot facsimile format using a ratio of 3 to 1 for a total of 1575 (525×3) facsimile dots (leaving unused less than 5 percent of the facsimile page on either side). As a result, assigning three facsimile lines to each of the rotated column strings of still-video image pixels yields a single line of 3×3 half-tone facsimile pixels.

2.2. Half-Tone Facsimile Pixels

FIGS. 2a–2f illustrate the exemplary 3×3 dot cluster matrix used to provide half-tone facsimile pixels. That is, each pixel comprises a cluster of 9 facsimile dots providing a 10-level grey scale of 0 to 9.

The choice of an exemplary 10-level grey scale represents a trade-off between grey level representation and pixel resolution, a trade-off that is effected by such factors as the noise of video signals and the simple averaging associated with the dot cluster pattern of each pixel, as well as perceived image quality. In addition, the exemplary 3×3 matrix fits well with the 90 degree transformation of a still-video column with 525 video raster lines onto a 1728-dot line of a facsimile page, providing 3 dots per raster line (for a total of 1575 dots) —a transformation technique that is relatively simple to perform and involves a relatively low level of digitization noise.

The dot clusters that form the half-tone facsimile pixels can accommodate either fixed or dithered geometries. The cluster size can be increased to increase the number of levels of grey which can be represented at the expense of the number of clusters which, when reduced, lowers resolution.

3. Real-Time Conversion System

The exemplary real-time still-video to facsimile system is designed to be a configured as a self contained package with an internal battery, including external interfaces for a telephone instrument and the telephone line, as well as video input/output. The system is compatible with manufacture from low cost, low power, monolithic integrated circuits.

Figure 3:
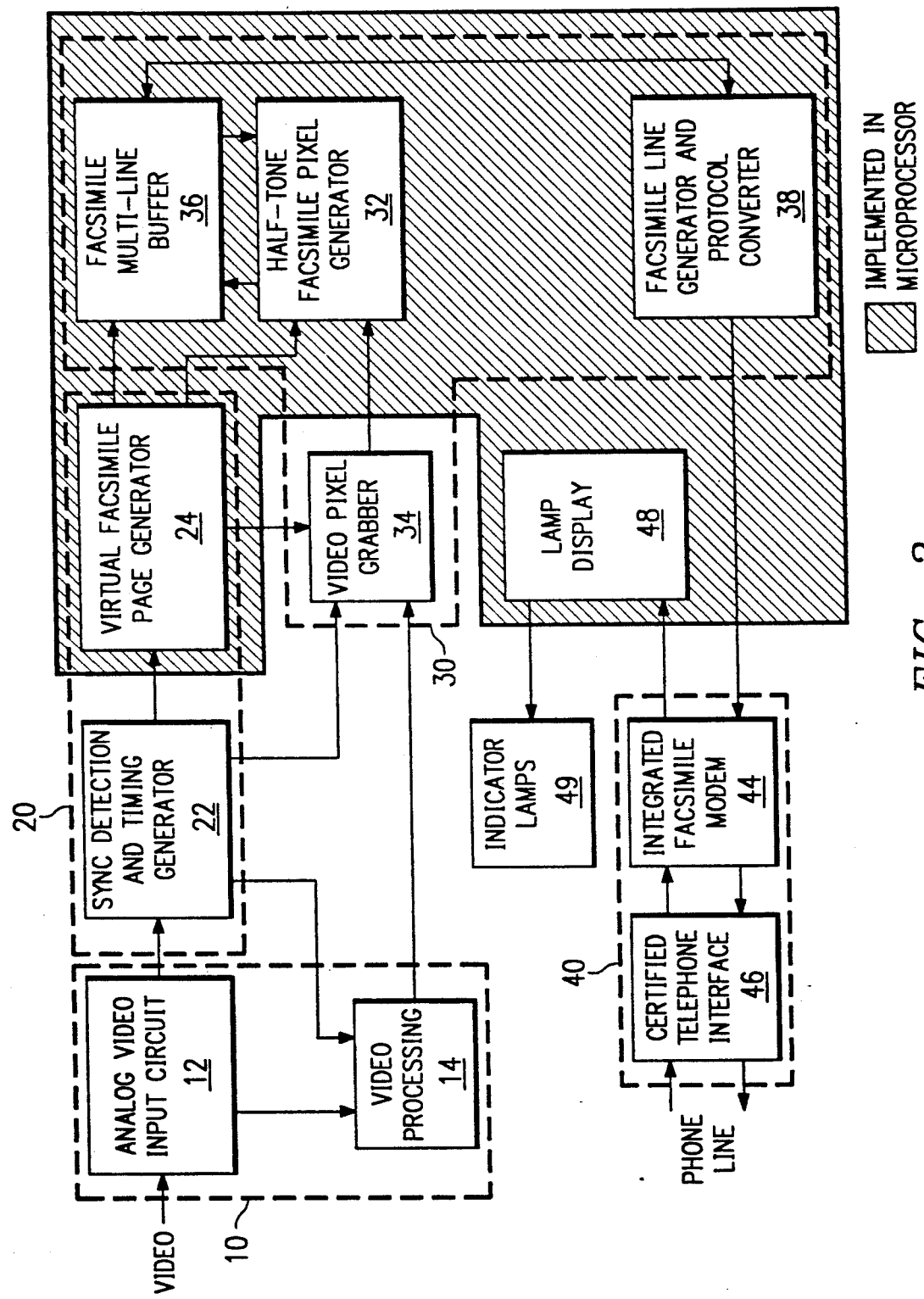
FIG. 3 is a functional block diagram of the exemplary real-time still-video to facsimile conversion system.

FIG. 3 is a schematic block diagram of the real-time still-video to facsimile conversion system. It includes modules for Still-Video Input 10, Virtual Facsimile Page Synchronization 20, Half-Tone Transformation 30, and Half-Tone Facsimile Output 40. In particular, the half-tone facsimile output module 40 implements conventional facsimile communications between the still-video to facsimile conversion system and standard Group III facsimile equipment.

3.1. Still-Video Input

The still-video input module 10 includes an analog input circuit 12 and a video processing circuit 14.

The analog input circuit 10 is accessed through the still-video input connector. Still-video images are accepted from a standard still-video source (not shown). For example, the still-video input can be an unchanging scene in a video camera, a freeze frame from a video disk or VCR, or a still-video camera.

During conversion for half-tone facsimile output, the still-video source transmits a still-video image as continuous frames, typically every 30th of a second.

The analog video input circuit provides a conventional interface to analog video signals. It provides standard input protection, gain control and signal amplification using commercially available integrated circuit components available from a number of manufacturers.

The Video processing circuit 14 customizes the response of the video amplifier in the analog video input circuit, optimizing the characteristics of the still-video signal for the exemplary application of providing a half-tone facsimile hard copy of the still-video image. Such processing includes standard gain compression and gain, as well as control over frequency response.

3.2. Virtual Page Synchronization

The virtual facsimile page synchronization module 20 includes a sync detection and timing generator 22 and a virtual facsimile page generator 24.

The synch detection and timing generator 22 provides standard video/coincidence detection and synchronization, using components that are commercially available from a number of manufacturers. Using conventional video synchronization techniques, this circuit synchronizes to the raster line and column position of a conventional still-video frame using digital line and column counters, establishing a line and column matrix of still-video image pixels (525 lines by 700 columns). In particular, the coincidence detection function provides a reliable indication of the presence of a stable video input signal, and can be used to trigger the real-time still-video to half-tone conversion process (as well as a VIDEO OK indicator lamp).

The synch detection and timing generator 22 provides frame synchronization signals to the virtual facsimile page synchronization generator 24, as well as to the video processing circuit 14 in the still-video input module 10.

The virtual facsimile page generator 24 synchronizes the still-video image frame to a virtual facsimile page. That is, the 525 by 700 line and column matrix defining the still-video image is in effect mapped into a corresponding virtual facsimile page matrix of 525 by 700 half-tone facsimile pixels, each of which is a 3×3 matrix of facsimile dots, using 1525 dots per facsimile line (525×3) and 2100 total facsimile lines (700×3). For the exemplary real-time still-video to facsimile conversion system, the virtual facsimile page generator is implemented in software using a commercially available microprocessor (such as the 85C15) which can generate multiple timing signals from a single crystal time base.

Thus, virtual page synchronization correlates the still-video image to a the standard facsimile format that would have been produced by conventional facsimile scanning.

3.3. Half-Tone Transformation

The half-tone transformation module 30 includes a half-tone pixel generator 32, a video pixel grabber 34, a facsimile multi-line buffer 36, and a facsimile line generator and protocol converter 38.

The half-tone facsimile pixel generator 32 processes column strings of still-video pixels, and generates the appropriate half-tone (grey scale) pattern of facsimile dots. Still-video to half-tone conversion processing is synchronized by the sync detection and timing generator 22.

The half-tone facsimile pixel generator 32 implements conventional half-tone processing techniques, including dot pattern selection and smoothing, to convert each still-video image pixel into an appropriate half-tone facsimile dot pattern. For example, conventional look-up table operations and weighting and smoothing algorithms can be used to transform digitized still-video pixels into half-tone.

The video pixel grabber circuit 34 is responsive to the virtual facsimile page synchronization generator 24 for grabbing selected column strings of still-video image pixels. Synchronization to the still-video image is provided by the sync detection and timing generator 22. Under the cross-synchronization control of the virtual facsimile page synchronization generator and the sync detection and timing generator, the video pixel grabber grabs selected still-video image pixels (6 bit video amplitude information) according to line and column position. Coincidence of the video sync timing and virtual facsimile page timing signals triggers standard analog to digital conversion of the selected video image pixel, thereby providing a corresponding digital video amplitude value to the half-tone pixel generator 32.

The half-tone pixel generator converts each column string of still-video image pixels into the appropriate three lines of facsimile data (a total of 525 pixels). These facsimile lines are buffered in the facsimile multi-line buffer for transmission to facsimile equipment.

The facsimile multi-line buffer 36 holds six facsimile lines corresponding to two lines of half-tone facsimile pixels (which correspond to two columns of still-video image pixels). Thus, the total buffer storage used is 1728 ×6 bits (1296 bytes). Three entire facsimile lines are buffered before facsimile transmission. As one set of three facsimile lines (one line of half-tone facsimile pixels) is transmitted, the other three facsimile lines are generated by the half-tone pixel generator and buffered in the facsimile multi-line buffer in preparation for transmission. This pipelining permits continuous transmission of facsimile data, as well as back-smoothing for dithering (randomization of using any of the buffered facsimile lines that are not actually being transmitted.

Conventional half-tone processing techniques, including pattern selection and smoothing, can be used to optimize the real-time still-video to facsimile conversion system for facsimile hard copy output. Regarding pattern selection, the simplest approach is to use table look-up with fixed dot patterns, although more sophisticated non-linear transformations involving analysis of video signal quality and adjacent pixels could be used. Regarding smoothing, an analysis of adjacent pixels can be used to provide dot pattern adjustments to improve image quality, including back-smoothing using one or more facsimile lines from previously buffered half-tone facsimile pixels.

The facsimile line generator and protocol converter reads the facsimile data out of the facsimile multi-line buffer 32, and transmits it to the half-tone hard copy output module 40 for transmission to a facsimile machine for hard copy output. The facsimile line generator and protocol controller operates conventionally in sequentially retrieving facsimile lines from the facsimile multi-line buffer 36, and providing the proper protocol interface for the integrated facsimile modem. It synchronizes the retrieval of facsimile lines and the transmission of the associated facsimile data through the integrated facsimile modem 44 (the protocol defined by the CCITT Group 3 Facsimile specification is followed).

For the exemplary real-time still-video to facsimile conversion system, those functions performed by the half-tone transformation module 30, other than those performed by the video pixel grabber circuit 34, are implemented conventionally in software using a commercially available microprocessor (such as the 85C15). Thus, the microprocessor is programmed to perform the functions of half-tone pixel generation 32, facsimile multi-line buffering 36, and a facsimile line generation and protocol conversion 38, along with the function of virtual facsimile page generation 24.

The video pixel grabber circuit 34 is implemented in a conventional manner using commercially available components. For example, the circuit can be assembled using digital counters, an 8-bit MUX, and a 6-bit analog-to-digital converter (such as an RCA 3100). The MUX operates as a sample-and-hold front end for the A/D converter. The A/D converter can operate at about 65 microseconds because it is converting only one video pixel per raster scan line—each still-video frame the video pixel grabber circuit 34 is only required to grab a single column of still-video pixels to form a column string of digitized still-video pixels.

3.4. Half-Tone Facsimile Output

The half-tone facsimile output module 40 includes an integrated facsimile modem 44, and a certified telephone interface 46. In addition, lamp display 48 and indicator lamps 49 provide optional maintenance control (including communications activity and video detection).

The integrated facsimile modem 44 is a conventional low power, integrated facsimile modem chip. The circuit is controlled by the facsimile line generator and protocol converter 38, and implements conventional facsimile communications according to Group 3 facsimile protocol negotiations and control.

The certified telephone interface 46 is a conventional telephone interface component that follows the guidelines and requirements of FCC ruling Part 68 (a different implementation would be required in different countries). It includes the isolation, protection, and interface connection as defined. The phone line interface connector is the RJ-11 connector, one for the telephone line and one for the telephone set used to initiate calls to a facsimile machine or other hard copy output device.

3.5. Still-Video to Facsimile Operation

Figure 4:
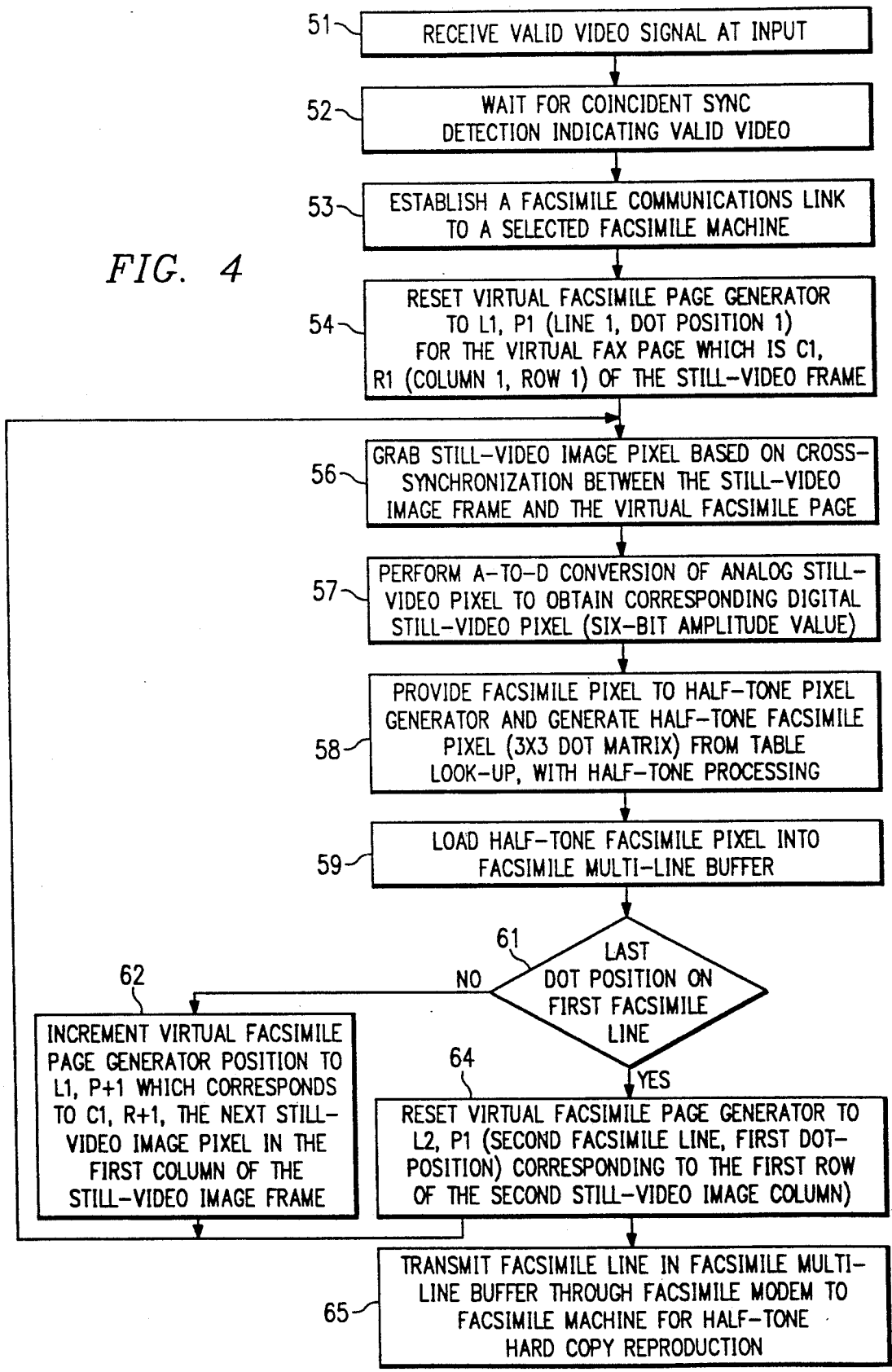
FIG. 4 is a flow diagram illustrating the operation of the real-time still-video to facsimile conversion system.

FIG. 4 illustrates the operation of the real-time still-video to facsimile conversion system. The conversion of a still-video image frame into a facsimile half-tone hard copy begins with the repetitive transmission of the still-video image frame to the real-time still-video to facsimile conversion system.

Referring to FIGS. 1 and 4, the still-video image frames are received (51) at the analog video input circuit 12. A received still-video image frame is input to the video processing circuit 14, and to the sync detection and timing generator 22. The sync detection and timing generator synchronizes to the still-video image frame: row (raster line) numbers from 1 to 525, and column position numbers from 1 to 700 (assuming a 4/3 aspect ratio).

The microprocessor waits (52) for the sync detection and timing generator to detect a coincident sync condition, indicating valid video. When coincidence is detected, the microprocessor resets (54) the virtual facsimile page generator 24 to Line 1, Pixel-Position 1, designated L1,P1, the initial facsimile pixel position of the first line of the virtual facsimile page. This initial dot position corresponds to the initial still-video image pixel at column 1, row 1 (or raster line 1), designated C1,R1.

At the same time, the microprocessor invokes the facsimile modem 44, which attempts to establish (53) a facsimile communications link to a selected facsimile machine. The microprocessor awaits the establishment of a facsimile connection, and when that is detected, begins the half-tone conversion and facsimile line transmission operations.

The virtual facsimile page generator 24 provides the line/pixel-position count to the video pixel grabber (34), which also receives the column/row count for the still-video image frame from the sync detection and timing generator 22. The video pixel grabber grabs (56) the still-video image pixel based on cross-synchronization between the two counts.

The video pixel grabber performs (57) an A-to-D conversion of analog still-video pixel to obtain corresponding digital still-video pixel (six-bit amplitude value). This still-video image pixel data is provided (58) to the half-tone facsimile pixel generator for conversion to half-tone.

The half-tone facsimile pixel generator converts the still-video image pixel data to a 3×3 half-tone facsimile pixel using a table look-up operation. In addition, half-tone processing can be performed to appropriately adjust the selected half-tone facsimile pixel value for improved image quality.

This 3×3 half-tone facsimile pixel is then loaded (59) into the facsimile multi-line buffer 36—for the L1,P1 pixel, the first three facsimile dot positions on each of the first three facsimile lines in the buffer.

If the facsimile pixel position count in the virtual facsimile page generator is not the last facsimile pixel-position on current line of the virtual facsimile page (61), then the microprocessor increments (62) the virtual facsimile page generator position to the next facsimile pixel position of the virtual facsimile page, L1,P+1 which corresponds to the next still-video image pixel C1,R+1 (i.e., column 1, next row or raster line).

If the facsimile pixel position count has reached 525, corresponding to the 525 raster lines of each still-video image column, then the microprocessor resets (64) the virtual facsimile page generator to the second facsimile line, first pixel position L2,P1 which corresponds to the first row (raster line) of the second still-video image column. In addition, a facsimile pixel position count of 525 indicates that an entire line of facsimile pixels has been converted into three corresponding lines of facsimile dots, which are in the multi-line buffer.

When three complete facsimile lines are in the facsimile multi-line buffer, the microprocessor invokes (65) the facsimile line generator and protocol converter 38 to transmit those facsimile lines through the facsimile modem 44 to the facsimile machine for half-tone hard copy output. The hard copy output from the facsimile machine appears in a landscape format as a half-tone reproduction of the transmitted still-video image frame.

4. Exemplary Applications

Exemplary applications for the real-time still-video to facsimile conversion system of the invention include the following.

The system can be used to capture, store, print and communicate the contents of conference-room display boards, such as marker boards. In the case of marker boards, current products, which involve expensive, proprietary and complex mechanics, could be replaced by the still-video conversion system of the invention, enabling the contents of any still-video image of a board to be printed on a local or remote facsimile machine.

The system can be used to provide immediate image transmission to remote offices (anywhere in the world at facsimile speeds), and provides an inexpensive means of an image storage and retrieval (for images of personnel, products, events or other photographic subjects) when used with standard still-video equipment. The image data base is immediately accessible as printed output without the additional expense of video printers.

The system can be built into commercial facsimile products to add both local and remote (to other facsimile machines) still-video hard copy. Adding the system to existing facsimile products can take advantage of existing electronics in those products, such as the facsimile modem, to provide a low cost capability upgrade.

What is claimed is:

1. A method of real-time still-video conversion for converting a still-video image frame captured by a still-video source into a half-tone reproduction produced by a hard copy output device without requiring the creation or storage of an intermediate image frame, comprising the steps:

for each still-video image frame, receiving repeated transmissions of the still-video image frame from the 10 still-video source until conversion is complete;

for each transmission of the still-video image frame, synchronizing the frame to a virtual hard copy page the defines a matrix of virtual hard copy pixels, with each virtual hard copy pixel being associated with a corresponding image pixel of the still-video frame which is characterized by an amplitude value;

in successive still-video image frames, converting successive blocks of image pixels into corresponding blocks of half-tone pixels, with each half-tone pixel having an appropriate half-tone dot pattern; and then transmitting each converted half-tone pixel in a block to the hard copy output device for producing a half-tone hard copy output;

repeating this conversion process until the still-video image frame is completely converted into a half-tone hard copy.

2. The method of real-time still-video conversion of claim 1, further comprising, after the step of receiving still-video image transmissions, the step:

video processing the received still-video image frame to optimize the conversion process for the hard copy output device.

3. The method of real-time still-video conversion of claim 1, wherein the step of converting image pixels into half-tone pixels includes half-tone processing the image pixels to optimize the conversion process for the hard copy output device.

4. The method of real-time still-video conversion of claim 3, wherein half-tone processing includes adjusting the half-tone dot pattern for adjacent half-tone pixels to provide smoothing for the hard copy output.

5. The method of real-time still-video conversion of claim 1, wherein a virtual hard copy page is formed by a predetermined number of hard copy lines each with a predetermined number of half-tone dot positions, such that each virtual hard copy pixel is defined by a predetermined number of adjacent half-tone dot positions on a predetermined number of adjacent lines, thereby forming a half-tone dot-matrix.

6. The method of real-time still-video conversion of claim 5, wherein the still-video image is divided into rows and columns of image pixels, and wherein the step of converting image pixels into half-tone pixels comprises the steps of:

in successive still video image frames, grabbing successive columns of image pixels;

using a 90 degree transformation rotation, converting each column of image pixels into a corresponding number of lines of half-tone dots to form a line of half-tone pixels, with each half-tone pixel being formed by a half-tone dot-matrix with an appropriate half-tone dot pattern.

7. The method of real-time still-video conversion of claim 6, wherein the still-video image frame is formed by 525 raster lines, wherein the hard copy output device is a facsimile machine using a dot format of at least 1575 dot positions per line, and wherein the half-tone dot-matrix is a 3×3 matrix such that each column of still-video image pixels is transformed into three hard copy lines with each still-video image pixel being assigned a corresponding half-tone pixel with three adjacent half-tone dot positions on each of the three hard copy lines.

8. The method of real-time still-video conversion of claim 1, further comprising, after the step of converting image pixels into half-tone pixels, the step of:
buffering an entire block of converted half-tone pixels prior to transmission of any of the pixels to the hard copy device.

9. The method of real-time still-video conversion of claim 8, wherein a virtual hard copy page is formed by a predetermined number of hard copy lines each with a predetermined number of half-tone dot positions, such that each virtual hard copy pixel is defined by a predetermined number of adjacent half-tone dot positions on a predetermined number of adjacent lines, thereby forming a half-tone dot-matrix, and wherein the block of converted half-tone pixels comprises an entire line of half-tone pixels formed by a corresponding number of hard copy lines.

10. The method of real-time still-video conversion of claim 9, wherein at least two lines of half-tone pixels are buffered, and wherein the step of converting image pixels into half-tone pixels includes half-tone processing the image pixels by adjusting the half-tone dot pattern for adjacent half-tone pixels on the same line and on adjacent lines to provide smoothing for the hard copy output.

11. A real-time still-video conversion system for converting a still-video image frame captured by a still-video source into a half-tone hard copy of the still-video image frame produced by a hard copy output device without requiring the creation or storage of an intermediate image frame, comprising:
a video input circuit for receiving repeated transmissions of a still-video image frame from the still-video source until conversion of that frame is complete;
a virtual page synchronizer for synchronizing each transmission of the still-video image frame to a virtual hard copy page that defines a matrix of virtual hard copy pixels, with each virtual hard copy pixel being associated with a corresponding image pixel of the still-video frame which is characterized by an amplitude value;
a half-tone transformer for converting successive blocks of image pixels from successive still-video image frames into corresponding blocks of half-tone pixels, with each half-tone pixel having an appropriate half-tone dot pattern; and
a transmitter circuit for transmitting each converted half-tone pixel in a block to the hard copy output device for producing a half-tone hard copy output;
such that successive blocks of image pixels from successive still-video image frames are converted by said half-tone pixel generator and transmitted to the hard copy output device until the still-video frame is completely converted into a half-tone hard copy.

12. The real-time still-video conversion system of claim 11, further comprising:
an input video processor for processing the received still-video image frame to optimize the conversion process for the hard copy output device.

13. The real-time still-video conversion system of claim 11, wherein the half-tone transformer performs half-tone processing of the image pixels to optimize the conversion process for the hard copy output device.

14. The real-time still-video conversion system of claim 13, wherein half-tone processing includes adjusting the half-tone dot pattern for adjacent half-tone pixels to provide smoothing for the hard copy output.

15. The real-time still-video conversion system of claim 11, wherein a virtual hard copy page is formed by a predetermined number of hard copy lines each with a predetermined number of half-tone dot positions, such that each virtual hard copy pixel is defined by a predetermined number of adjacent half-tone dot positions on a predetermined number of adjacent lines, thereby forming a half-tone dot-matrix.

16. The real-time still-video conversion system of claim 15, wherein the still-video image is divided into rows and columns of image pixels, and wherein the half-tone transformer comprises:
an image pixel grabber for grabbing, in successive still video image frames, successive columns of image pixels;
a half-tone pixel generator for converting, using a 90 degree transformation rotation, each column of image pixels into a corresponding number of lines of half-tone dots to form a line of half-tone pixels, with each half-tone pixel being formed by a half-tone dot-matrix with an appropriate half-tone dot pattern.

17. The real-time still-video conversion system of claim 16, wherein the still-video image frame is formed by 525 raster lines, wherein the hard copy output device is a facsimile machine using a dot format of at least 1575 dot positions per line, and wherein the half-tone dot-matrix is a 3×3 matrix such that each column of still-video image pixels is transformed into three hard copy lines with each still-video image pixel being assigned a corresponding half-tone pixel with three adjacent half-tone dot positions on each of the three hard copy lines.

18. The real-time still-video conversion system of claim 11, further comprising a buffer for buffering an entire block of converted half-tone pixels prior to transmission of any of the pixels to the hard copy device.

19. The real-time still-video conversion system of claim 18, wherein a virtual hard copy page is formed by a predetermined number of hard copy lines each with a predetermined number of half-tone dot positions, such that each virtual hard copy pixel is defined by a predetermined number of adjacent half-tone dot positions on a predetermined number of adjacent lines, thereby forming a half-tone dot-matrix, and wherein the block of converted half-tone pixels comprises an entire line of half-tone pixels formed by a corresponding number of hard copy lines.

20. The real-time still-video conversion system of claim 19, wherein at least two lines of half-tone pixels are buffered, and wherein the half-tone pixel generator processes the image pixels by adjusting the half-tone dot pattern for adjacent half-tone pixels on the same line and on adjacent lines to provide smoothing for the hard copy output.

21. A method of real-time still-video conversion for converting a still-video image frame captured by a still-video source into a half-tone facsimile reproduction produced by a conventional facsimile machine without requiring the creation or storage of an intermediate image frame, comprising the steps:

for each still-video image frame, receiving repeated transmissions of the still-video image frame from the still-video source until conversion is complete;

for each transmission of the still-video image frame, synchronizing the frame to a virtual facsimile page that defines a matrix of virtual facsimile pixels, with each virtual facsimile pixel being associated with a corresponding image pixel of the still-video frame which is characterized by an amplitude value;

the virtual facsimile page being formed by a predetermined number of virtual facsimile lines each with a predetermined number of half-tone dot positions, such that each virtual facsimile pixel is defined by a predetermined number of adjacent half-tone dot positions on a predetermined number of adjacent virtual facsimile lines, thereby forming a half-tone dot-matrix;

in successive still-video image frames, converting successive blocks of image pixels into a corresponding line of half-tone pixels, each line of half-tone pixels being formed by corresponding virtual facsimile lines, and each half-tone pixel having an appropriate half-tone dot pattern;

buffering the virtual facsimile lines associated with at least one line of half-tone pixels; and then transmitting the buffered virtual facsimile lines to the facsimile machine for producing a half-tone facsimile output;

repeating this conversion process until the still-video image frame is completely converted into a half-tone facsimile reproduction.

22. The method of real-time still-video conversion of claim 21, further comprising, after the step of receiving still-video image transmissions, the step:

video processing the received still-video image frame to optimize the conversion process for facsimile reproduction.

23. The method of real-time still-video conversion of claim 21, wherein the step of converting image pixels into half-tone pixels includes half-tone processing the image pixels to optimize the conversion process for facsimile reproduction.

24. The method of real-time still-video conversion of claim 23, wherein half-tone processing includes adjusting the half-tone dot pattern for adjacent half-tone pixels to provide smoothing for the facsimile reproduction.

25. The method of real-time still-video conversion of claim 21, wherein the still-video image is divided into rows and columns of image pixels, and wherein the step of converting image pixels into half-tone pixels comprises the steps of:

in successive still video image frames, grabbing successive columns of image pixels;

using a 90 degree transformation rotation, converting each column of image pixels into a corresponding number of facsimile lines of half-tone dots to form a line of half-tone pixels, with each half-tone pixel being formed by a half-tone dot-matrix with an appropriate half-tone dot pattern.

26. The method of real-time still-video conversion of claim 25, wherein the still-video image frame is formed by 525 raster lines, wherein the facsimile machine uses a dot format of at least 1575 dot positions per line, and wherein the half-tone dot-matrix is a 3×3 matrix such that each column of still-video image pixels is transformed into three facsimile lines with each still-video image pixel being assigned a corresponding half-tone pixel with three adjacent half-tone dot positions on each of the three facsimile lines.

27. The method of real-time still-video conversion of claim 26, wherein at least two lines of half-tone pixels are buffered, and wherein the step of converting image pixels into half-tone pixels includes half-tone processing the image pixels by adjusting the half-tone dot pattern for adjacent half-tone pixels on the same line and on adjacent lines to provide smoothing for the facsimile output.

* * * * *

UNITED STATES PATENT AND TRADEMARK OFFICE
CERTIFICATE OF CORRECTION

PATENT NO. :  5,193,012
DATED      :  March 9, 1993
INVENTOR(S) :  Jonathan E. Schmidt It is certified that error appears in the above-identified patent and that said Letters Patent is hereby corrected as shown below:

Column 6, line 36, delete "ar" and insert -- are --.

Column 12, line 18, after "the" delete "10".

Signed and Sealed this

Fourth Day of January, 1994

Attest:

BRUCE LEHMAN

Attesting Officer          Commissioner of Patents and Trademarks